United States Patent [19]
Yang et al.

[11] Patent Number: 5,760,833
[45] Date of Patent: Jun. 2, 1998

[54] READOUT OF PIXEL DATA FROM ARRAY OF CCD IMAGE DETECTORS

[75] Inventors: Sean Yang, Encinitas; Karl Edwin Moerder, Poway, both of Calif.

[73] Assignee: Torrey Science Corporation, San Diego, Calif.

[21] Appl. No.: 650,619

[22] Filed: May 20, 1996

[51] Int. Cl.[6] .................................................. H04N 3/14
[52] U.S. Cl. .................................... 348/323; 348/324
[58] Field of Search .................................. 348/322, 323, 348/324, 311, 294; 257/231

[56] References Cited

U.S. PATENT DOCUMENTS

| | | | |
|---|---|---|---|
| 4,672,453 | 6/1987 | Sakamoto | 348/311 |
| 4,750,042 | 6/1988 | Murayama et al. | 348/323 |
| 4,949,183 | 8/1990 | Stevens | 348/323 |
| 4,980,771 | 12/1990 | Ueda et al. | 348/323 |
| 5,153,731 | 10/1992 | Nagasaki et al. | 257/231 |

OTHER PUBLICATIONS

Sauer et al., "High Fill–Factor CCD Imager with High Frame–Rate Readout", Sarnoff Research Center Report, 1990.
Yamagishi et al., "A 2 Million Pixel FIT–CCD Image Sensor for HDTV Camera Systems", IEEE Transactions on Electron Devices, vol. 38, No. 5, May 1991, pp. 976–980.
Amelio and Dyck, "Distributed Floating Gate Amplifier", NATO Advanced Study Institute on Solid State Imaging, Sep. 1975, pp. 605–614.

*Primary Examiner*—Wendy Garber
*Attorney, Agent, or Firm*—Edward W. Callan

[57] ABSTRACT

In systems for reading pixel data from an array of horizontal m-bit rows of CCD image detectors, pixel data loaded in parallel from a row of the array into an m-bit shift register is transferred in parallel from the m-bit shift register into other data storage device(s) having a plurality of output ports and sensed by a plurality of output amplifiers respectively connected in parallel to the output ports of the other data storage device(s). In a parallel-output-serial-register system in which the m-bit serial shift register has n cells at one end of the m-bit shift register that respectively have n output ports and an output register having n cells respectively connected in parallel to the n output ports of the m-bit shift register, with a plurality of different cells of the output register respectively having output ports, the loaded pixel data is shifted through the shift register toward the n output ports thereof and the shifted pixel data is transferred in parallel from the n output ports of the shift register into the n cells of the output register for sensing by output amplifiers respectively connected to the output ports of the output register.

4 Claims, 1 Drawing Sheet

READOUT OF PIXEL DATA FROM ARRAY OF CCD IMAGE DETECTORS

BACKGROUND OF THE INVENTION

The present invention pertains to reading pixel data from an array of charge-coupled-device (CCD) image detectors. A typical CCD image detector array includes a plurality of m-bit rows, wherein m is a plural integer. Typically, m is $2^x$, wherein x is a plural integer, such as 10.

One prior art system for reading pixel data from such a typical CCD image detector array includes an m-bit serial shift register with n cells at one end of the m-bit shift register respectively having n output ports, wherein m and n are plural integers and m is a plural-integer multiple of n. In this prior art system, the pixel data is loaded in parallel from the array into the shift register one row at a time and the loaded pixel data is shifted through the shift register toward the n output ports, from which the shifted pixel data is non-destructively sensed in parallel by n output amplifiers connected to the n output ports. Such a parallel-output-serial-register system is described by Amelio and Dyck, "Distributed Floating Gate Amplifier", NATO Advanced Study Institute on Solid State Imaging, September 1975, pp. 605–614. A difficulty with connecting multiple output amplifiers to consecutive cells of the shift register is that the pitch of an output amplifier is wider than the pitch of a shift register cell, whereby the nature of the connections of a plurality of output amplifiers to consecutive shift register cells sometimes distorts the pixel data being transferred from the shift register cells to the output amplifiers. The pitch is the dimension in the direction in which data is shifted serially through the shift register.

SUMMARY OF THE INVENTION

The present invention provides an improved system for reading pixel data from an array of horizontal m-bit rows of CCD image detectors, wherein pixel data loaded in parallel from a row of the array into an m-bit shift register is transferred in parallel from the m-bit shift register into other data storage device(s) having a plurality of output ports and sensed by a plurality of output amplifiers respectively connected in parallel to the output ports of the other data storage device(s).

The present invention overcomes the difficulty associated with parallel-output-serial-register system described by Amelio and Dyck by providing a system for reading pixel data from an array of horizontal m-bit rows of CCD image detectors, comprising an m-bit serial shift register with n cells at one end of the m-bit shift register respectively having n output ports, wherein m and n are plural integers and m is greater than n; means for loading pixel data in parallel from the array into the m-bit shift register one row at a time; means for shifting the loaded pixel data through the m-bit shift register toward the n output ports thereof; an output register having n cells respectively connected in parallel to the n output ports of the m-bit shift register, with a plurality of different cells of the output register respectively having output ports; a plurality of output amplifiers respectively connected in parallel to the output ports of the output register for sensing pixel data transferred to the output ports of the output register; and means for transferring the shifted pixel data from the n output ports of the m-bit shift register into the n cells of the output register for sensing by the respective output amplifiers connected to the output ports of the output register.

Additional features of the present invention are described with reference to the detailed description of the preferred embodiments.

DETAILED DESCRIPTION

Figure 1:
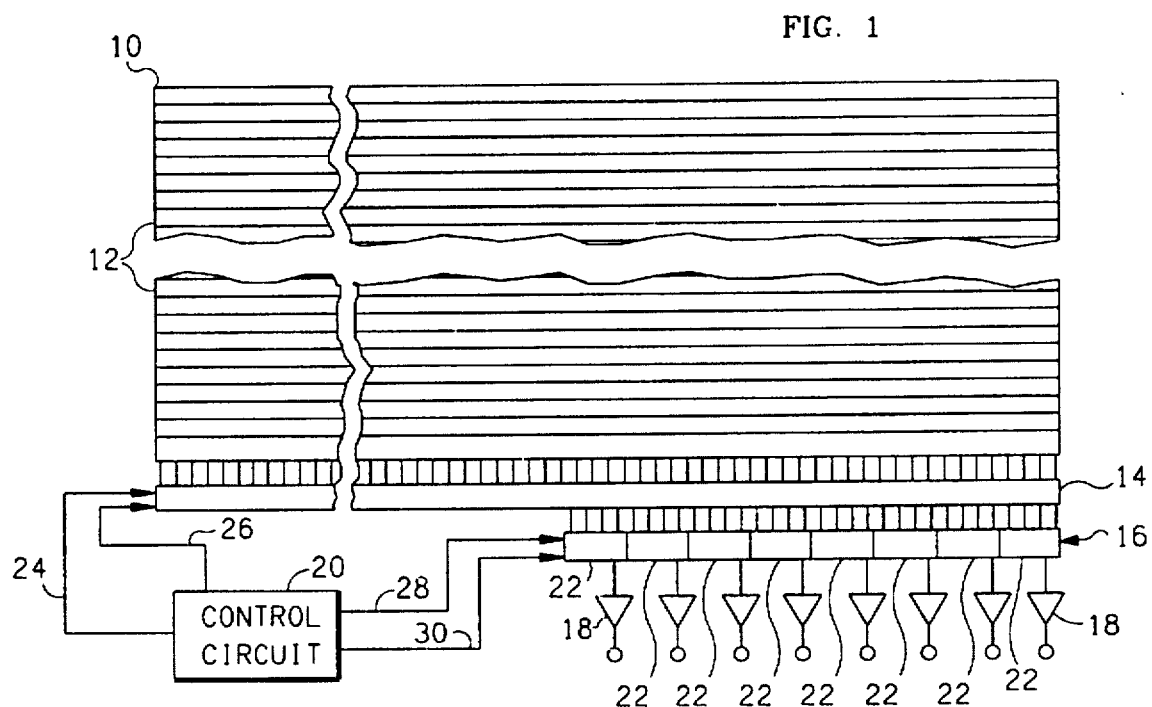
FIG. 1 is diagram of a preferred embodiment of a parallel-output-serial-register CCD pixel array readout system according to one aspect of the present invention.

Referring to FIG. 1, one preferred embodiment of a parallel-output-serial-register system for reading pixel data from an array 10 of horizontal m-bit rows 12 of CCD image detectors in accordance with one aspect of the present invention includes an m-bit serial shift register 14, an output register 16, a plurality of output amplifiers 18 and a control circuit 20. The m-bit serial shift register 14 has n cells at one end thereof and the n cells respectively have n output ports. The output register 16 includes n/p segregated p-cell shift registers 22. An end cell of each of the p-cell shift registers 22 has an output port. m, n and p are plural integers; m is a plural-integer multiple of n; and n is a plural-integer multiple of p. In one version of the preferred embodiment shown in FIG. 1, m is 1024, n is 32 and p is 4, whereby there are eight segregated 4-cell shift registers 22.

There are n/p of the output amplifiers 18 respectfully coupled in parallel to the n/p output ports of the p-cell shift registers 22 for sensing pixel data shifted to the output ports of the p-cell shift registers 22. Each of the cells of the output register 16 that has an output port has the same pitch as the output amplifier 18 connected to such output port.

The control circuit 20 provides a first gate signal 24 to the m-bit shift register 14 that causes pixel data to be loaded in parallel from the array 10 into the m-bit shift register 14 one row 12 at a time. The control circuit 20 then provides a sequence of second gate signals 26 that cause the loaded pixel data to be shifted through the m-bit shift register 14 toward the n output ports thereof.

The control circuit 20 provides a third gate signal 28 to each of the multiple-cell shift registers 22 to cause the shifted pixel data to be transferred in parallel from the n output ports of the m-bit shift register 14 and registered in the n cells of the output register 16. The control circuit 20 then provides a sequence of fourth gate signals 30 that cause the transferred pixel data to be shifted through each of the p-cell shift registers 22 toward the respective output ports of the p-cell shift registers 22 for sensing by the respective output amplifiers 18 connected to the output ports of the output register 16.

While the transferred pixel data is being shifted through the p-cell shift registers 22 toward the respective output ports of the p-cell shift registers 22, an additional n bits of pixel data is being transferred through the m-bit shift register 14 to the n cells at the end of the m-bit shift register 14 in response to another sequence of second gate signals 26 from the control circuit 20. Another third gate signal 28 is then provided by the control circuit to each of the multiple-cell shift registers 22 to cause the additional n bits of shifted pixel data to be transferred in parallel from the n output ports of the m-bit shift register 14 and registered in the n cells of the output register 16. The control circuit 20 then provides another sequence of fourth gate signals 30 that cause the additional n bits of transferred pixel data to be shifted through each of the p-cell shift registers 22 toward the respective output ports of the p-cell shift registers 22 for sensing by the respective output amplifiers 18 connected to the output ports of the output register 16.

The sequence of second gate signals 26, the third gate signal 28 and the sequence of fourth gate signals 30 are repeated until all m bits have been read out from the m-bit shift register 14 and sensed by the output amplifiers 18. Then the control circuit 20 provides another first gate signal 14 to the m-bit shift register 14 to cause the next row 12 of pixel data to be loaded in parallel from the array 10 into the m-bit shift register 14. The first gate signal 24, the sequence of second gate signals 26, the third gate signal 28 and the sequence of fourth gate signals 30 are repeated as described above until all of the pixel data has been read out from the array 10 and sensed by the output amplifiers 18.

The system of the present invention requires less image reconstruction and thereby reduces the cost and complexity of supporting electronic apparatus.

The advantages specifically stated herein do not necessarily apply to every conceivable embodiment of the present invention. Further, such stated advantages of the present invention are only examples and should not be construed as the only advantages of the present invention.

While the above description contains many specificities, these should not be construed as limitations on the scope of the present invention, but rather as examples of the preferred embodiments described herein. Other variations are possible and the scope of the present invention should be determined not by the embodiments described herein but rather by the claims and their legal equivalents.

We claim:

1. A system for reading pixel data from an array of horizontal m-bit rows of CCD image detectors, comprising an m-bit serial shift register with n cells at one end of the m-bit shift register respectively having n output ports, wherein m and n are plural integers and m is greater than n;

means for loading pixel data in parallel from a row of the array into the m-bit shift register one row at a time;

means for shifting the loaded pixel data through the m-bit shift register toward the n output ports thereof;

an output register having n cells respectively connected in parallel to the n output ports of the m-bit shift register, with a plurality of different cells of the output register respectively having output ports;

a plurality of output amplifiers respectively connected in parallel to the output ports of the output register for sensing pixel data transferred to the output ports of the output register; and means for transferring the shifted pixel data from the n output ports of the m-bit shift register into the n cells of the output register for sensing by the respective output amplifiers connected to the output ports of the output register.

2. A system according to claim 1, wherein each of the output register cells having an output port has the same pitch as the respective output amplifier connected to said output port.

3. A system according to claim 2, wherein the output register includes n/p segregated p-cell shift registers for registering the n bits of pixel data transferred thereto, with each of the p-cell shift registers having one of said output-register output ports at one end thereof, wherein p is an integer and n is a plural-integer multiple of p;

wherein there are n/p of said output amplifiers respectfully coupled to the n/p output ports of the p-cell shift registers for sensing pixel data shifted to the output ports of the p-cell shift registers; and wherein the system further comprises means for shifting pixel data through the p-cell shift registers toward the respective output ports of the p-cell shift registers.

4. A system according to claim 1, wherein the output register includes n/p segregated p-cell shift registers for registering the n bits of pixel data transferred thereto, with each of the p-cell shift registers having one of said output-register output ports at one end thereof, wherein p is an integer and n is a plural-integer multiple of p;

wherein there are n/p of said output amplifiers respectfully coupled to the n/p output ports of the p-cell shift registers for sensing pixel data shifted to the output ports of the p-cell shift registers; and wherein the system further comprises means for shifting pixel data through the p-cell shift registers toward the respective output ports of the p-cell shift register.

* * * * *